United States Patent [19]
Åkesson

[11] 3,809,209
[45] May 7, 1974

[54] APPARATUS FOR CONTROLLING THE FEED OF LOOSE MATERIAL

[75] Inventor: Yngve Reinhold Åkesson, Halsingborg, Sweden

[73] Assignee: Produits Findus S.A., Vevey, Switzerland

[22] Filed: May 12, 1972

[21] Appl. No.: 252,800

[30] Foreign Application Priority Data
May 18, 1971 Switzerland.......................... 7255/71

[52] U.S. Cl. ................................................. 198/167
[51] Int. Cl. ............................................ B65g 15/00
[58] Field of Search ........................... 198/167, 204

[56] References Cited
UNITED STATES PATENTS
2,906,393  9/1959  West..................................... 18/167
2,230,018  1/1941  Stromstad.......................... 198/167

*Primary Examiner*—Richard E. Aegerter
*Attorney, Agent, or Firm*—Blum Moscovitz Friedman & Kaplan

[57] ABSTRACT

Apparatus for controlling the feed of loose material in a transport channel, in which a shaft carrying rotating arms is carried by an oscillating support.

3 Claims, 1 Drawing Figure

PATENTED MAY 7 1974 3,809,209
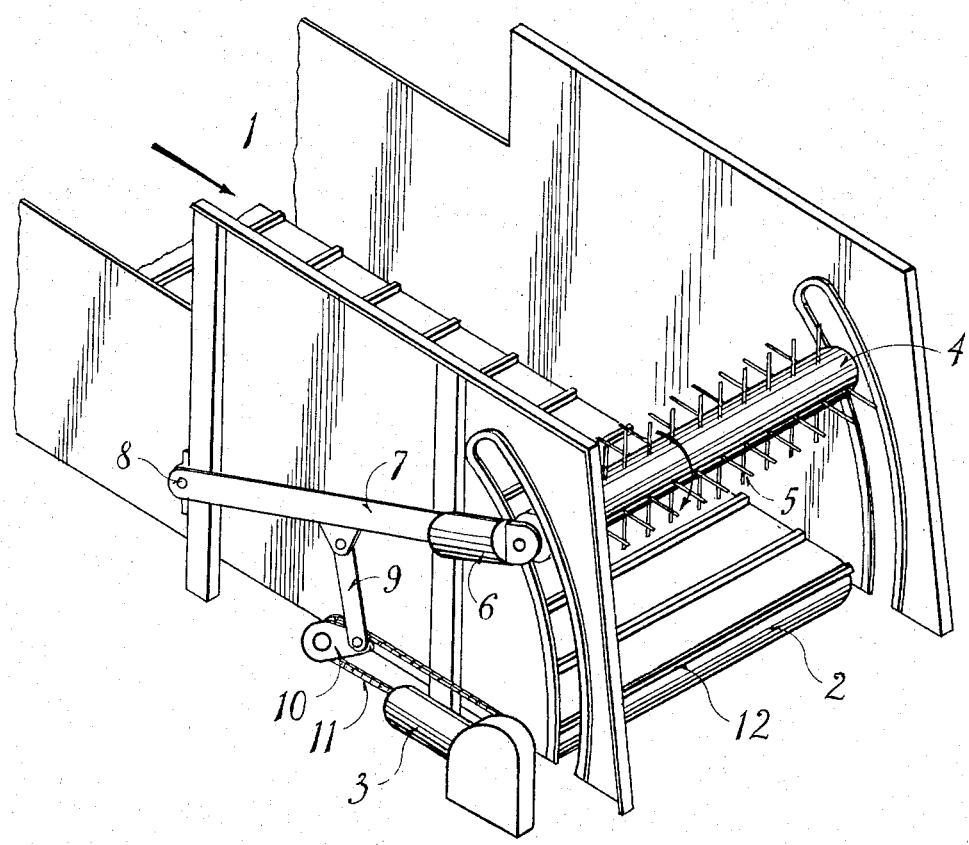

APPARATUS FOR CONTROLLING THE FEED OF LOOSE MATERIAL

The present invention concerns an apparatus for controlling the feed of loose material in a transport channel.

An apparatus is known which comprises a shaft carrying rotating arms. This sort of apparatus has only a limited field of action and its efficiency is thus small. Multiplying such apparatus would produce a kneading effect and damage the material submitted to their action.

The apparatus according to the invention avoids the above-cited inconvenience. It comprises a shaft carrying rotating arms carried by an oscillating support.

The annexed drawing represents, by way of example, an embodiment of the invention.

The sole FIGURE represents an isometry of an apparatus for controlling the feed in a transport channel.

In the drawing, a transport channel generally designated by 1 comprises two side walls between which is placed a carrying band 2 forming the bottom of the channel. This band is driven by a motor 3 and carries a series of transversal bars 12.

In another embodiment, a series of transversal bars 12 is carried by chains (not shown) and glides on the bottom of the channel made of a fixed sheet 2.

Inside the channel is a shaft 4 carrying rotating arms 5 and driven by a motor 6. This shaft is carried by a beam 7 journalled at 8 and by another similar beam, not visible in the drawing and symmetrically placed on the other side of the channel. Both beams form a support for the shaft 4. Each beam is connected to a connecting rod and crank (9, 10) driven by means of a chain 11 by the motor 3 which also drives the carrying band and the bars.

The operation of the apparatus is as follows:

The loose material (for example vegetables) is loaded at the left end (not shown) of the transport channel and led by the carrying band and the bars towards the apparatus controlling the feed. Due to the up-and-down movement of the supporting beams, the shaft 4 carrying rotating arms relieves and loosens the material on the whole height of the layer of material, without kneading or damaging it.

Due to the fact that the same motor 3 drives the oscillating beams and the carrying band and bars, the up-and-down movement of the shaft 4 is synchronised with the feed of the material and the vertical displacement speed of the shaft carrying the rotating arms is proportional to the feed.

I claim:

1. Apparatus for controlling the feed of loose material in a transport channel, comprising a channel having spaced apart side-walls and a carrying band constituting the bottom of said channel, said band being mounted within said side-walls to reverse direction within the extent of said side walls, bars traversing the width of said band and affixed thereto, arcuate slots in said side walls, said slots being in registry with each other and terminating proximate said point of reversal of said moving band, a rotary shaft having an end protruding through each of said slots, fingers extending outward from said shaft along that portion of said shaft within said channel, oscillatable support means having one end pivoted to each of said side walls at points which are the centers of said arcs of said arcuate slots, said shaft being rotatably mounted on the other end of said support means, means for oscillating said support means for moving said shaft within said arcuate slots, the extent of oscillation of said support means being such that said fingers approach but do not make contact with said band or bars, and means for driving said band.

2. Apparatus according to claim 1, wherein the rate of movement of said band is synchronized with the rate of oscillation of said support means.

3. Apparatus according to claim 1, wherein said means for driving said conveyor means is a motor being operatively connected to said carrying band and said oscillatable support means.

* * * * *